Jan. 30, 1951     O. H. WISEGARVER     2,539,764
FILM ADVANCING AND METERING MEANS
FOR ROLL FILM CAMERAS
Filed June 17, 1947     3 Sheets-Sheet 1
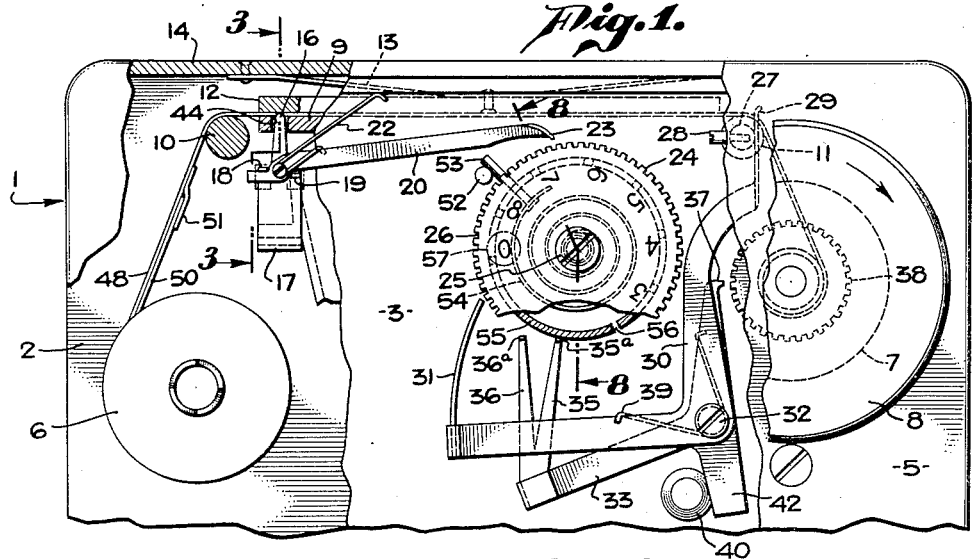
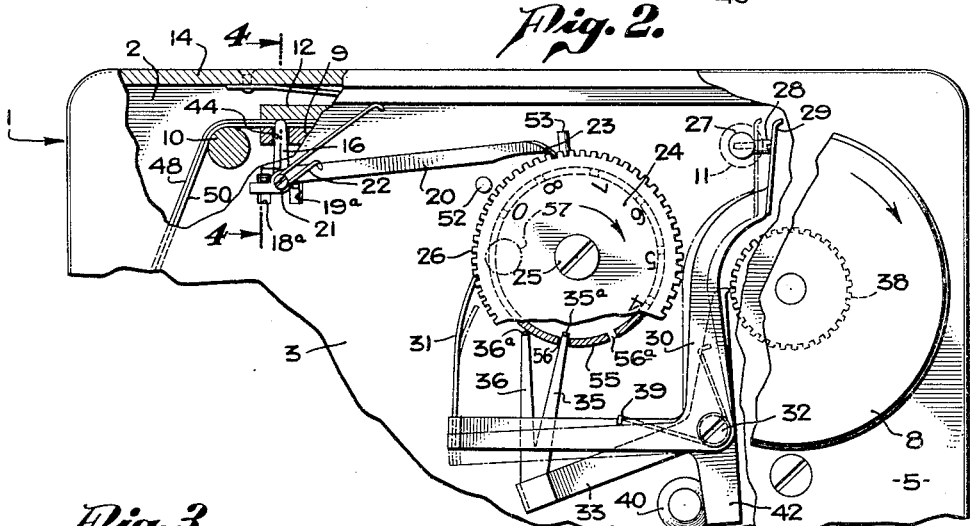
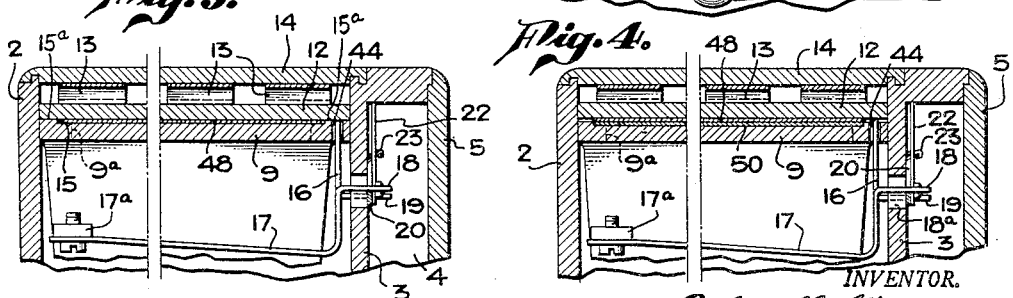
INVENTOR.
Orton H. Wisegarver
BY
ATTORNEY

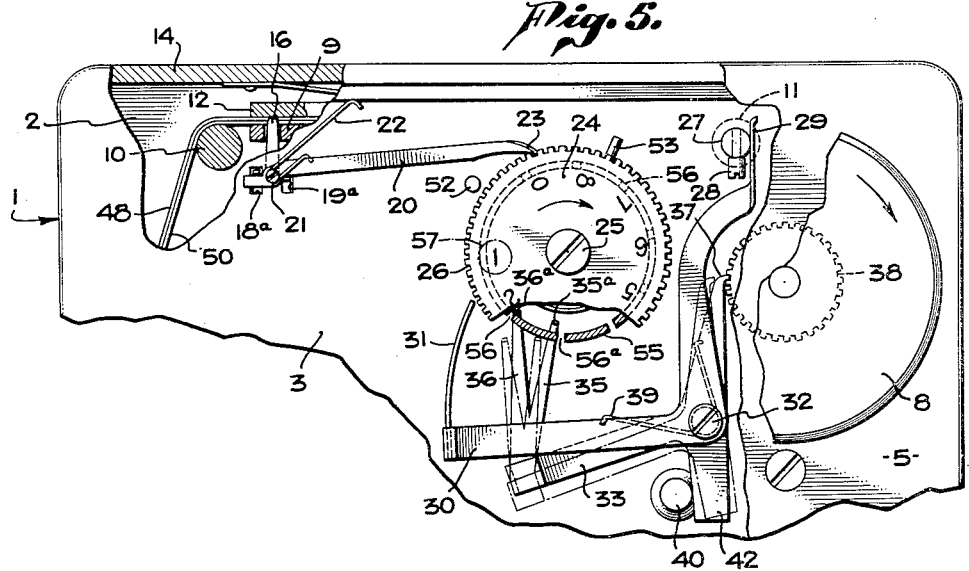
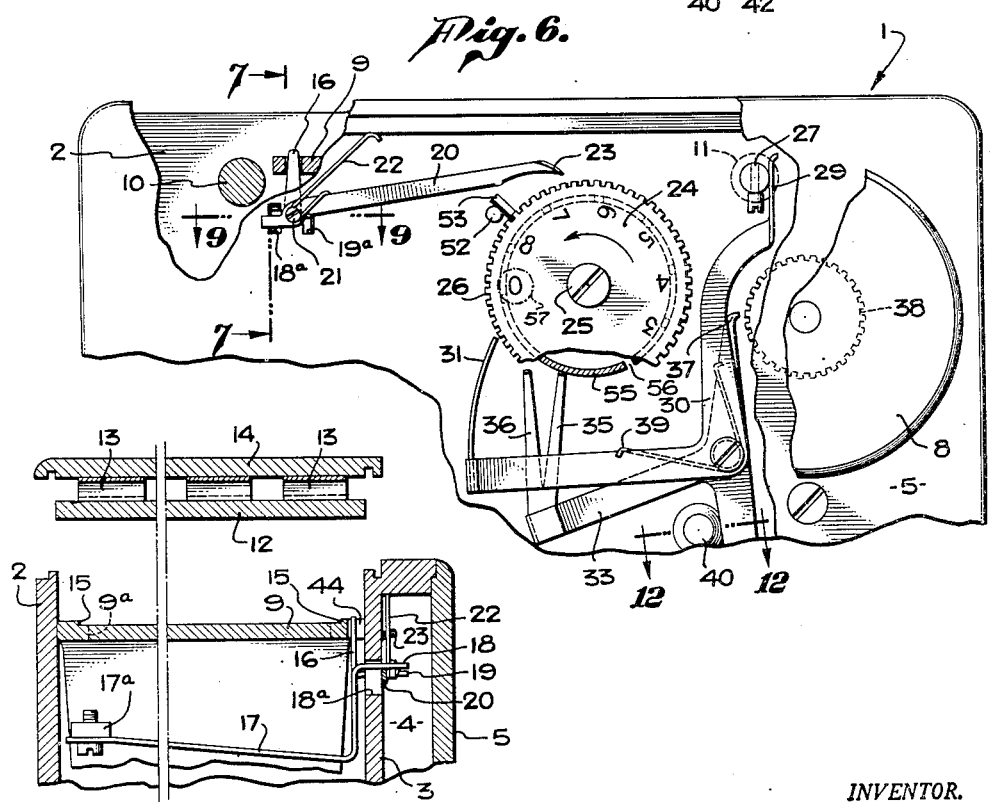

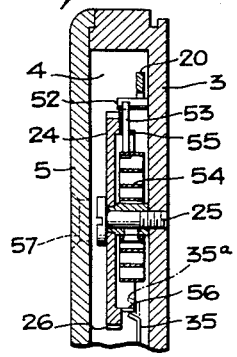
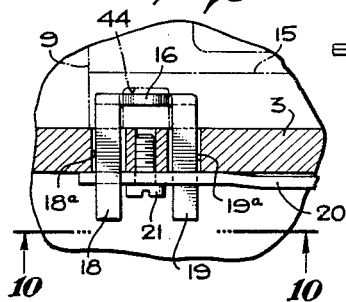
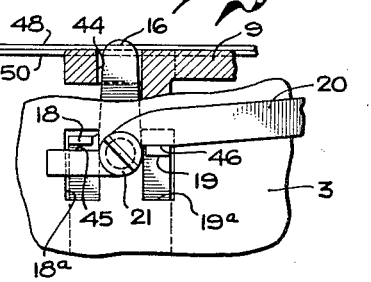
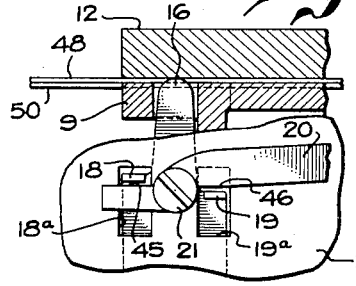
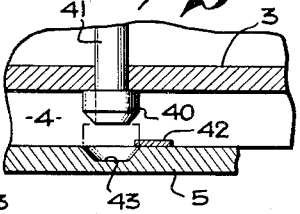
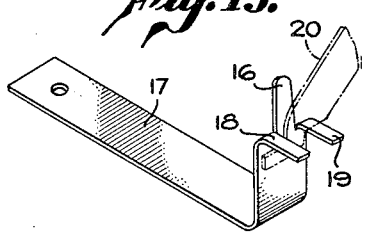
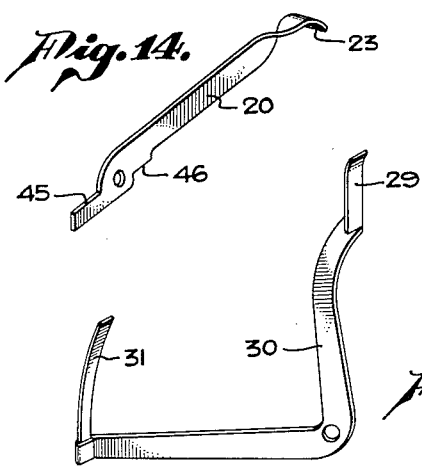
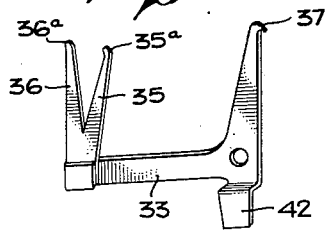

Patented Jan. 30, 1951

2,539,764

UNITED STATES PATENT OFFICE 2,539,764

FILM ADVANCING AND METERING MEANS FOR ROLL FILM CAMERAS

Orton H. Wisegarver, Los Angeles, Calif., assignor, by mesne assignments, to Gordon B. Pollock, South Laguna, Calif., a corporation of California Application June 17, 1947, Serial No. 755,132

5 Claims. (Cl. 95—31)

This invention relates to photographic cameras, and pertains particularly to metering means for producing the desired advance of a roll film to and through successive picture-taking positions within the camera.

One of the particular objects of the invention is to provide a metering means of the character set forth, which initiates its metering action in response to the presence of the photosensitive roll-film material itself, in the absence of any operations required to be conducted by the user other than the simple act of operating the conventional film-advancing means to cause the roll film to be advanced through the camera.

The device of this invention is adapted for use in roll-film cameras which utilize a roll-film comprising a strip or length of photosensitive material and a light-sealing protective backing strip which is also utilized as a leader to effect movement of the roll-film through the camera. In this utilization, the device of this invention is adapted to respond to the presence of the photosensitive layer at the position of the picture-taking aperture in the camera and provide for interruption of the film-advancing movement or manual advance of the film at desired intervals so that the correct length of film is advanced to and past the photographic aperture for the successive photographic "exposures," and to provide for free and unhampered advancement of the roll-film in a completion of the winding operation after the last photographic exposure has been made.

A further object of the invention is to provide a metering means for a roll-film camera, characterized in that means are provided for sensing the presence of the photosensitive layer at the photographic aperture to thereby cause the metering mechanism to function so long as such layer is present at the aperture, yet disconnect the metering function when such layer is not so present and thereby permit free and unhampered film advancement up to the time the photosensitive layer is brought to the photographic aperture and after the film has been withdrawn therefrom.

A further and important object of the invention is to provide a metering means for a roll film camera having a film pressure plate of conventional function, such metering means including a sensing device responsive to the position of the pressure plate which is itself positioned by the thickness of material present between the pressure plate and the photographic aperture, whereby the actual sensing of the presence or absence of the photosensitive layer and/or the associated backing-strip is obtained by engagement with the pressure plate rather than engagement upon the photosensitive layer.

A further object of the invention is to provide a metering device of the character described, which is simple in construction, precise in operation, and which may be produced at a low cost when compared with structures of comparable function which have heretofore been proposed.

Other objects and features of the invention will be brought out in or will be apparent from the ensuing description of a preferred embodiment thereof, as illustrated in the accompanying drawings, in which:

Fig. 1 is a fragmentary side elevation of a camera body provided with a film-metering mechanism of my invention, with sections of the body walls broken away to show the essential operating parts, with a roll film "loaded" in the mechanism ready to be advanced to the "No. 1" exposure position;

Fig. 2 is a view corresponding to Fig. 1, showing the relation of parts when the film-roll has been advanced sufficiently to move the photosensitive film-layer into the picture-aperture zone, a position intermediate to that of Fig. 1 and the "No. 1" exposure position;

Fig. 3 is a sectional detail as taken on line 3—3 in Fig. 1;

Fig. 4 is a view corresponding to Fig. 3, as taken on line 4—4 in Fig. 2;

Fig. 5 is a view corresponding to Figs. 1 and 2, showing the film-roll advanced to bring the photosensitive layer to the "No. 1" exposure position;

Fig. 6 is a view corresponding generally to that of Figs. 1, 2 and 5, showing, however, the camera back or cover removed so as to lift the pressure plate away from the picture aperture, such cover and the pressure plate being omitted;

Fig. 7 is a transverse section taken on line 7—7 of Fig. 6, showing the cover and pressure plate separated from the picture aperture;

Fig. 8 is a sectional detail of the metering wheel portion of the device, as taken on line 8—8 of Fig. 1;

Fig. 9 is a partly broken-away sectional detail as taken on line 9—9 in Fig. 6;

Fig. 10 is a partly broken-away longitudinal sectional detail as taken on line 10—10 in Fig. 9, showing on larger scale than Figs. 1, 2, 5 and 6 and the relative position of pressure plate, sensor, and metering wheel detent member in the condition of Fig. 6;

Fig. 11 is a view corresponding to Fig. 10, showing the relative position of the parts in the condition of Fig. 2;

Fig. 12 is a sectional detail as taken on line 12—12 of Fig. 6;

Fig. 13 is a perspective detail of the sensor member which is utilized to control the metering action of the mechanism;

Fig. 14 is a perspective detail of the metering wheel detent member responsive to the action of the sensor member of Fig. 13;

Fig. 15 is a perspective detail of the metering wheel advancing pawl which is employed in association with the film metering wheel, and Fig. 16 is a perspective detail of a locking lever employed to constrain the film take-up spool against rotation in response to the action of the metering wheel.

Referring to the accompanying drawings illustrative of an embodiment of the invention, showing the metering structure applied to the body portion of a camera, such body portion or camera casing is illustrated by the numeral 1, comprising side walls 2 and 3, a space 4 at the side wall 3 within which a metering mechanism may be disposed, and a cover 5 for the space 4. Means are provided for supporting within the camera casing a film feed spool 6 and a film take-up spool 7 provided with an operating knob 8. A conventional film aperture plate 9 is provided, having a film aperture 9a, together with guide rollers 10 and 11 at the respective feed and take-up ends of the aperture plate 9. A pressure plate 12 is provided to maintain the roll film or photosensitive surface in position at the film aperture 9a, as is customarily employed in cameras of the roll film type, and such pressure plate may be mounted through the agency of springs 13 upon a removable back or cover 14 adapted to form enclosure for the camera body 1. A guide recess is provided as at 15 in the film aperture plate 9, of a width such as to receive the roll film, so as to maintain the transverse location thereof in passing over the film aperture plate in its longitudinal travel through the camera from the feed spool 6 to the take-up spool 7.

The construction above set forth is essentially common to roll film photographic cameras and is described merely as an illustration of the environment within which the exposure-length metering mechanism of this invention may be employed. Modification from this structure and corresponding modifications in the metering means in consonance therewith will be apparent to those skilled in the art. The metering mechanism may comprise a film sensor finger 16 carried by a spring arm 17 mounted on a lug 17a on the camera structure and provided with a pair of operating fingers 18 and 19 extending laterally into the space 4 through openings 18a and 19a in the wall 3. The sensor finger is normally biased by the spring arm 17 to cause it to engage upon the pressure plate 12, and thus cause the operating fingers 18 and 19 to adopt a position which reflects the pressure plate position, which latter position is dependent upon the presence or absence of the photographic material and/or backing layer at the photographic aperture. The finger 18 may be considered the "thin" side control element (operative when the thickness of the roll film between the pressure plate 12 and the aperture plate 9 is less than the operating normal) and the finger 19 may be considered a "thick" side control member (operative when the thickness of the roll film between the pressure plate and the aperture plate is greater than the operating normal, or when the pressure plate is completely removed from normal position with respect to the aperture plate). The operating fingers 18 and 19 are adapted to coact with a metering wheel detent lever 20 pivotally mounted on the wall 3 as at 21 and provided with a bias spring 22 adapted to exert a clockwise moment on the lever 20 so as to normally cause the detent end portion 23 of the lever 20 to be biased toward engagement with the periphery of a film metering wheel or position indicating means 24, hereinafter called a count wheel, pivotally mounted as at 25 on the wall 3. The periphery of the count wheel 24 is provided with a plurality of gear or ratchet teeth 26 for engagement by the detent end portion 23 of the detent lever 20, and for engagement by the advancing means for producing rotation of the wheel 24, hereinafter described.

Means are provided for advancing the count wheel 24 in response to longitudinal movement of the roll film through the camera, and to this end the roller 11 may be provided with a projecting end shaft portion 27 carrying an operating cam 28 adapted to engage a foot portion 29 of a metering wheel advancing pawl arm 30 carrying at its other end a spring finger 31 adapted to engage the ratchet teeth 26, the metering wheel advancing pawl arm 30 being pivotally mounted on the wall 3 as at 32. A locking lever 33, which may pivotally be mounted in common with the arm 30, at 32, having a pair of positioning fingers 35 and 36 on one end and a locking pawl 37 on its other end is provided to coact with the wheel 24 and with a locking ratchet 38 on the shaft of the spool 7. A spring bias means is provided to act on the pawl arm 30 and the locking lever 33, to exert a counterclockwise action upon the arm 30 and a clockwise action on the lever 33, such as through the agency of a spring wire 39 engaging the arm 30 and lever 33 and extending about the pivotal mounting 32. As hereinafter described, the locking lever 33 is adapted to move into engagement with the locking ratchet 38 when the count wheel 24 has attained certain indicating positions. To effect a return of the locking lever 33 to the position of Fig. 1 after completion of an operation and prior to the institution of a second metering operation, I may provide a resetting member 40 formed, as for example, as a truncated cone mounted on a shaft 41 slidably disposed on the camera side wall, and adapted to engage an off-set lug 42 on the lever 33. Fig. 12 illustrates the operative association of the member 40 with the lug 42, and it will be apparent that movement of the member 40 into engagement with the lug 42 will cause the lug to move to the right in Fig. 1, exerting a counter-clockwise effort upon the locking lever 33. A recess 43 may be provided in the cover 5 to receive the forward end of the member 40 in its full-operation position.

The spring finger 16 which forms a portion of the sensor device responsive to the thickness of roll film between the film aperture plate and the pressure plate 12 is preferably arranged to engage the pressure plate 12 at one side of the position of the roll film material, and to this end the aperture plate 9 may be provided with a slot 44 within which the spring sensor finger 16 extends. The detent lever 20 is provided with operating surfaces 45 and 46 respectively adapted for engagement by the spring fingers 18 and 19 in the production of the desired rotation of the lever 20 during operation of the device. The roll film, of a conventional type, may comprise a backing or protective layer of paper or the like, as indicated at 48, carrying a layer of photosensitive material 50 attached thereto through the agency of a strip of adhesively secured material 51. The thicknesses of the protective backing layer 48, the photosensitive layer 50, and the adhesively attached joint 51 are exaggerated in the drawings with respect to the scale employed for showing the operative portions of the mechanism; actually, for example, the thickness of the photosensitive layer may be only in the neighborhood of .006 inch and that of the backing layer in the neighborhood of .004 to .005 inch, and the combined thickness of the backing layer, photosensitive layer, and adhesively applied attachment strip 51, may be in the neighborhood of about .016 to .018 inch.

In the operation of the device, the pressure plate 12 will constantly be urged toward the film aperture plate 9 under the influence of the springs 13 when the cover 14 is closed, and when the roll film is first placed in the camera and the extended end of the leader or paper protective backing layer 48 is passed over the aperture plate 9 and then about the take-up spool 7 so that it may be advanced through the camera by rotation of the knob 8 in the normal fashion, this backing layer will rest between the opposed shoulders provided by the guide 15 in the aperture plate 9, and the pressure plate will normally bear directly upon the lands 15a at the lateral edges of the aperture plate 9 which will represent the maximum inward (downward in the figures of drawings) position of the pressure plate. Referring to Figs. 1 and 3, this position is illustrated, showing the pressure plate 12 bearing against the sensor finger 16, depressing the spring 17 and causing the spring finger 18 to bear on the operating surface 45 of the lever 20, lifting said lever against the biasing action of the spring 22 until the detent end 23 thereof is clear of the toothed portion 26 on the periphery of the roller 24.

Assuming that the locking pawl 37 of the lever 33 is out of engagement with the locking ratchet 38 on the take-up spool shaft (position of Fig. 1), the rotation of the knob 8 by the operator will cause the backing layer 48 to be pulled past the photographic aperture, over the rollers 10 and 11, rotating the roller 11 and causing the operating cam 28 to move the metering wheel advancing pawl arm 30 (as may be seen by comparison of Figs. 1 and 2), and this movement causes the spring finger 31 to intermittently engage the toothed periphery 26 of the count wheel 24. A stop pin 52 is provided on the side wall 3 in position to be engaged by a coacting stop pin 53 on the count wheel 24, a coil spring 54 being provided for the count wheel 24 tending to rotate it in a counterclockwise direction so as to bring the pins 52 and 53 into a normal engagement as shown in Fig. 1. This position represents the starting position for the device and a convenient symbol such as the numeral "0" may be provided on the face of the count wheel in position to be viewed through a window in the side wall of the camera casing cover 5, as shown at 57, in dot-dash lines in Figs. 1, 2, 5, and 6, and in dotted lines in Fig. 8. This intermittent movement obtained by the rotation of the roller 11 and effected through spring finger 31 serves to advance the count wheel 24 a minor amount (limited by the stroke of the arm 30), and as soon as the spring finger 31 is withdrawn from engagement with the toothed periphery 26 of the count wheel 24, the count wheel is returned by spring 54 to the limit position represented by the stop pins 52 and 53. The knob 8 is thus free to permit continuous longitudinal movement of the roll film through the photographic aperture and onto the take-up spool 7. When the added thickness of the backing layer 48 plus the photosensitive layer 50 reaches the position of the spring finger 16, the pressure plate 12 will be pushed away from the position shown in Figs. 1 and 3 to a position such as shown in Figs. 2 and 4, the sensor finger 16 necessarily following the position of the pressure plate under the urging of the spring 17, and carrying the two fingers 18 and 19 upwardly. The setting of the fingers 18 and 19 is such that when the sensor finger 16 has been raised the slight amount occasioned by the added thickness of the photosensitive layer 50, the spring finger 18 is pulled away from the operating surface 45 of the detent lever 20 and the spring finger 19 is not yet brought into engagement with the operating surface 46 on the lever 20, thus freeing the lever 20 for clockwise rotative movement under the urging of the bias spring 22. This brings the detent end portion 23 of the lever 20 into engagement with the toothed periphery 26 of the count wheel 24. When this change in the setting of the ratchet lever 20 has been effected, further intermittent movement of the pawl arm 30 (resulting from continued rotation of the roller 11 from the continued operation of the knob 8 and longitudinal movement of the roll film) will be preserved as a plurality of successive advancements of the count wheel 24, each successive advance being retained by the ratchet action of the detent 23 on the toothed periphery 26.

For the purpose of controlling the amount of rotative movement of the knob 8 to locate a given exposure length at the exposure aperture, I provide a guard cylinder portion 55 on the count wheel 24 adapted to support the laterally bent tip portions 35a and 36a of positioning fingers 35 and 36 of the locking lever 33. The guard cylinder 55 is provided with a plurality of angularly spaced openings 56, through which the laterally bent tip portions 35a and 36a of fingers 35 and 36 may successively pass as the respective openings are brought into position in alignment therewith. The spring 39 urges the fingers 35 and 36 toward engagement with the guard cylinder 55, and in Fig. 8 in greater detail it will be seen that I have caused the tip-end portions 35a and 36a of the positioning fingers to be bent laterally so as to normally engage the guard cylinder 55 yet to pass inwardly through the opening 56 when such opening is properly aligned with the respective fingers. As shown in Fig. 2 three successive advancing movements of the count wheel 24 have been effected by the spring finger 31 and the pawl arm 30 (at the rate of two teeth on the ratchet or gear-toothed periphery 26 for each intermittent movement), rotating the count wheel to a position such that the first of the openings 56 has been brought into alignment with the positioning finger 35, and the tip portion 35a of this finger has passed through the opening 56 to cause a partial rotative movement of the locking lever 33 in a clockwise direction by spring 39. It will be seen, however, that the tip portion 36a of finger 36 is now in engagement with the outer periphery of guard cylinder 55, so as to stop the rotative movement of lever 33 at the position shown in Fig. 2. In this position of lever 33 the locking pawl 37 is still out of engagement with the ratchet 38, and continued rotation of the knob is thereby possible. In moving inward through the opening 56, the bent tip portion 35a of finger 35 passes through said opening to the position shown in Fig. 2 and indicated in dot-dash lines in Fig. 8, so as not to interfere with further rotation of count wheel 24 by the spring finger 31 of pawl arm 30. Continued longitudinal advancement of the roll film through the aperture plate is thus permitted until two more rotations of the roller 11 have been effected, causing an advance in the position of the count wheel 24. In this new position, represented by Fig. 5, the first opening 56 has been brought into alignment with the tip portion 36a of the positioning finger 36, and said portion 36a of this positioning finger has dropped through the opening, allowing the locking lever 33 to rotate further in a clockwise direction and bringing the locking pawl 37 into engagement with the ratchet 38 on the take-up spool shaft, thus immobilizing the winding knob 8. Since the tip portion 35a of finger 35 had previously moved inward through the opening 56 in the movement of lever 33 from the position shown in Fig. 1 to the position shown in Fig. 2, it is free of the guard cylinder 55 so as to permit the above described further movement of lever 33 to the position of Fig. 5 when the opening 56 comes into alignment with the tip portion 36a of finger 36. The camera is then in condition for production of the first photographic exposure, the numeral "1" on the count wheel 24 having been brought opposite the inspection window 57 as shown in Fig. 5. As further may be seen from Fig. 5, the next successive opening 56a in the guard cylinder 55 has not yet been brought to the position of the positioning finger 35. When an exposure of the existing film position has been effected, the locking means may be released by operation of the member 40, pressing against the lug 42 on the locking lever 33 and counter-clockwisedly rotating the lever 33 to bring the pawl 37 out of engagement with the ratchet 38 and lifting the spring fingers 35 and 36 past the guard cylinder 55. When the member 40 is released, the spring 39 will rotate the locking lever 33 in a clockwise direction to the dot-dash position shown in Fig. 5, where the tip end 35a of the positioning finger 35 will again rest against the surface of the guard cylinder 55 adjacent the opening 56a. When the knob 8 is then rotated and the roller 11 caused to move to bring the operating cam 28 into engagement with the foot 29 of the advancing pawl arm 30, and thus secure a new advancing movement of the count wheel 24 in a clockwise direction, the tip portion 35a of positioning finger 35 will fall through the opening 56a, and upon two succeeding movements of the spring finger 31 the tip portion 36a of positioning finger 36 will fall through the opening 56a and again cause the locking pawl 37 to engage with the ratchet 38 and immobilize the advancing mechanism. In this position of the count wheel 24, the numeral 2 (as will be apparent from Fig. 5) will be brought to the position of the inspection window 57, showing that the second exposure-length of film is ready for photographic exposure.

The indicia represented on the count wheel 24 runs from the zero position to film exposure positions one through eight, as would be employed if the camera is adapted to use an eight-exposure film. If the device is adapted to meter a twelve-exposure film, for example, it will be appreciated that different indicia may be provided. With the proportions shown in this particular embodiment of the invention, the diameter of the roller 11 is selected such that the circumference thereof is equal to one-third the desired exposure-length required for advancement of the photosensitive layer between exposure positions, thus necessitating three revolutions of the roller 11 and three successive intermittent movements of the count wheel 24 by the spring finger 31 in moving from one exposure position to the next succeeding. The spacing of the openings 56 will thus be equivalent to the three intermittent movements of the count wheel 24, and the corresponding spacing between the positioning fingers 35 and 36 may be selected at about two-thirds of this value, in which case the first intermittent movement by the finger 31 will cause the positioning finger 35 to drop through an opening and two successive advancing movements of the count wheel 24 are then necessary to bring this opening adjacent the next succeeding positioning finger 36.

The above-described operations carrying the roll film into successive exposure positions may be continued until the last exposure position is reached, it being appreciated that the releasing member 40 may be integrated with the shutter release mechanism provided for the camera, as is common in other types of metering mechanisms provided for photographic devices. When the last exposure position is reached and the releasing member 40 operated to enable the next succeeding advancing movement of the operating knob, the operator advances the film just as though he were bringing the film to a next succeeding exposure position, which will withdraw the free end of the photosensitive layer 50 past the position of the spring finger 16. When this free end (not shown) is sufficiently removed to permit the pressure plate 12 to move toward the aperture plate 9 into the position of Fig. 1, the finger 16 will again engage the operating surface 45 of the lever 20, lifting the detent end 23 of the lever 20 free of the toothed periphery 26 of the count wheel 24. As soon as the spring finger 31 is released from contact with the toothed periphery 26, as a result of continued rotation of the roller 11, the spring 54 will return the count wheel to its counter-clockwise position indicated in Fig. 1. Occasionally, the free end of the film layer will be brought only part way out of the exposure aperture, by the film advancing movement following the last exposure, and it will be necessary to release the locking mechanism by operating the unlocking member 40 at which time the positioning fingers 35 and 36 will be lifted away from the guard cylinder 55, allowing the free return of the count wheel to the position of Fig. 1. It will be appreciated that the metering operation will stop, and the count wheel 24 will return to the position of Fig. 1, when the end of the film is reached, independent of whether there are eight or more exposures on the film. In view of this, the metering mechanism may be enabled to operate on eight, ten, twelve or sixteen exposures, for example, in fact, any number of exposures, even or odd, for which there is adequate film length, inasmuch as the metering mechanism will be disconnected when the photosensitive film end is reached no matter how long the film. If sixteen exposures are provided for on the metering wheel 24, it is merely necessary to place the openings 56 in closer separation to one another, and to provide for a smaller angular movement of the metering wheel for each metered position of the film.

When the film is wound clear through the camera and onto take-up spool 7, the device will have the condition illustrated in Fig. 6, with the finger 16, however, in engagement with the pressure plate 12, (not shown), after the manner of Fig. 1. The detent lever 20 will then be in the position illustrated in Fig. 1. When the cover 14 is separated from the camera casing, as is usually required when the exposed film is to be removed from the take-up position and a new film is to be inserted, the removal of the pressure plate 12 from engagement with the finger 16 will allow the spring member 17 to move the sensor finger 16 and the spring fingers 18 and 19 upwardly, to the position particularly illustrated in Figs. 6 and 10, in which case the finger 19 will engage the operating surface 46 of the detent lever 20 and move the lever counter-clockwise about its pivot 21, lifting the detent end portion 23 clear of the periphery 26 of the count wheel 24. This position is illustrated in full lines in Figs. 9 and 10. This frees the metering mechanism during the initial operation wherein a fresh roll of film is applied at 6 and the leader or free end of the backing layer 48 is passed over the exposure aperture and wound about the take-up spool, in a reloading operation. The advancing knob 8 may then be turned at the will of the operator to bring the paper leader taut according to conventional practice, the cover 14 may then be closed, and the film further advanced until the metering operation is again instituted as a result of the added thickness of the photosensitive layer coming between the pressure plate and the aperture plate, and the No. 1 position of the film obtained, as above described, It is preferable that the sensor finger 16 be located in adjacency to the film aperture, so that the metering mechanism can be caused to start when the leading edge of the photosensitive layer reaches the aperture position, and inasmuch as it is conventional to provide a somewhat greater length of film for the first exposure position, to provide a film leader for subsequent handling of the film in the finishing operation, I have so placed the first opening 56 in the guide cylinder 55 so that more than the normal number of rotations of the roller 11 will be required to bring the first metering position into effect. On the scale shown, as will be apparent from Figs. 1, 2 and 5, three advancing actions of the spring finger 31 upon the count wheel 24 will be required to bring the first opening 56 into alignment with the first positioning finger 35, and two subsequent advancing movements will be required to bring such opening in alignment with the second positioning finger 36, making a total of five advancing movements for the first exposure position. Subsequent exposure positions are attained, as above described, by a total of three advancing movements of the spring finger and the count wheel 24. The above proportions are given by way of example only, and will not be considered as limitative on the broad concept of my device, it being appreciated that any specific construction prepared for a given camera will be arranged to suit the operating requirements of that camera, and will obviously be subject to modification. Other modifications of my invention will occur to those skilled in the art and I do not choose to be limited to the precise details herein set forth, but rather to the scope of the subjoined claims. It will be appreciated that the actual presence of the thickened portion of the film structure resulting at the leading edge of the photosensitive surface 50 by way of the presence of the adhesively attached member 51, plays no particular part in this invention, and the photosensitive layer 50 may be attached to the backing layer 48 in some other manner not leading to this additional thickness and the apparatus will remain equally operative. The presence of the combined thicknesses of the layers 48 and 50 is the criterion for the spacing of the sensor finger 16 at a position such as to free the detent lever and allow it to be urged into contact with the periphery of the count wheel 24 under the influence of the spring 22, and it will further be appreciated that the device as above described lends itself to very precise adjustment at the factory even with rather generous manufacturing tolerances, inasmuch as the spring fingers 18 and 19 may be bent into adjusted position by the final assembly worker to cause them to have the freedom of operating movement above described, in which the finger 18 acts to maintain a separation of the detent 23 from the count wheel 24 in the "thin" condition and the finger 19 operates to maintain this separation in a "thick" condition of the film material at the pressure plate position.

I claim:

1. In a photographic camera adapted to utilize a roll film comprising a photosensitive layer and a protecting backing layer, each of finite thickness, and a film-advancing means for producing longitudinal movement of said roll film through said camera, an exposure-length metering structure which comprises: a count-wheel; support means mounting said count-wheel for rotation; biasing means constraining said count-wheel toward rotation in one direction; stop means for said count-wheel to limit rotation of said count-wheel in said one direction at a given position; advancing means for said count wheel operable to engage said count wheel and cause intermittent rotative advance thereof in the other direction away from said given position; operating means for said advancing means, said operating means being located in the path of such roll film and adapted to be rotated thereby during longitudinal travel of said roll film through said camera; a pawl member independent of said advancing means and movable into and out of position to engage said count wheel and constrain the same against rotation in said one direction; a film-thickness sensor member controlling the position of said pawl member, said sensor member having a portion located adjacent said roll film and adapted to assume a position such as to position said pawl member out of engagement with said count wheel whenever said protecting backing layer alone is present at the location of said portion, and adapted to assume a position such as to position said pawl member in engagement with said count wheel only when said backing layer and said photosensitive layer are both present at said location; locking means for said film-advancing means controlled by the rotative advance of said count wheel in said other direction and adapted to immobilize such film-advancing means at given rotatively advanced positions of said count wheel; and means for unlocking said locking means.

2. In a photographic camera adapted to utilize a roll film comprising a photosensitive layer and a protecting backing layer, each of finite thickness, and provided with a film-advancing means for producing longitudinal movement of said roll-film past an exposure aperture, and pressure plate means adapted to bear against the protecting backing to maintain said photosensitive layer in position against said exposure aperture, an exposure-length metering structure which comprises: a count wheel carrying indicia representing a plurality of progressively increasing numerically designated exposure positions, said exposure positions increasing in one direction about the axis of said wheel; means supporting said count wheel for rotation about said axis; biasing means constraining said wheel toward rotation in said one direction; stop means limiting the biased rotation of said count wheel to a given position off the scale of said indicia; advancing means for said count wheel operable to intermittently engage the same and cause intermittent rotative advance thereof in the opposite direction away from said given position so as to progressively rotate said count wheel through said plurality of exposure positions; operating means for said advancing means, said operating means being located in the path of such roll film and adapted to be rotated thereby during longitudinal movement thereof through said camera; a detent member engageable with said count wheel, said detent member being independent of said advancing means and adapted to retain each intermittent advance thereof against the action of said biasing means when in engagement therewith; a sensor member controlling the engagement of said detent member with said count wheel, said sensor member having a portion located in position for contact by said pressure plate means and movable thereby to position said detent member in engagement with said count wheel under an operating condition such that both layers of said roll film are present at said exposure aperture and position the same out of engagement with said count wheel under all other operating conditions of said camera; locking means for said film-advancing means controlled by the rotative advance of said count wheel in said opposite direction and adapted to immobilize such film-advancing means upon rotation of said count wheel to each exposure position in response to longitudinal movement of said roll film one exposure-length; and means for unlocking said locking means.

3. In a roll-film camera provided with film-advancing means adapted to cause longitudinal travel of a roll-film backing layer and attached photosensitive layer through successive exposure positions at the exposure aperture of said camera, and with means for indicating such successive exposure positions, such indicating means being adapted for coaction with said film-advancing means to indicate such exposure positions upon advance of said film a given exposure length, and locking means responsive to operation of said indicating means to engage said film-advancing means and cause interruption of film-advancing movement thereof whenever an exposure position of such film is indicated by said indicating means; a control device for said indicating means which comprises: detent means adapted to engage said indicating means and render the same coactive with said film advancing means only when both backing layer and photosensitive layers are present adjacent said exposure aperture, said detent means including a sensor member responsive to the thickness of said roll film.

4. In a roll-film camera provided with film-advancing means adapted to cause longitudinal travel of a roll-film backing layer and attached photosensitive layer through successive exposure positions at the exposure aperture of said camera, and with means for indicating such successive exposure positions, such indicating means being adapted for coaction with said film-advancing means to indicate such exposure positions upon advance of said film a given exposure length, and locking means responsive to operation of said indicating means to engage said film-advancing means and cause interruption of film-advancing movement thereof whenever an exposure position of such film is indicated by said indicating means; a control device for said indicating means which comprises: a backing member on said camera adapted to engage the rearward surface of the roll-film backing layer and movable in a forward and rearward direction dependent upon the thickness of said roll film as represented by the combined thickness of said layers and the thickness of said backing layer; sensor means positioned in proximity to said exposure aperture and including a sensor finger normally biased into engagement with said backing member and movable in response to the movement of said backing member; a detent member adapted to engage said indicating means and render the same coactive with said film advancing means; control means on said sensor means movable in response to the movement of said sensor finger, said control means being adapted to engage and move said detent member to cause engagement of said detent member with said indicating means only when said backing member is positioned by said combined layer thickness, and to cause said detent member to be out of engagement with said indicating means at all other positions of said backing member.

5. In a photographic camera adapted to utilize a roll film comprising a photosensitive layer and a protecting backing layer, each of finite thickness, and provided with a film-advancing means for producing longitudinal movement of said roll film past an exposure aperture, and a pressure plate normally biased in a direction toward said aperture for engagement with the backing layer of a roll film present therein, and positionable in spaced relation to said aperture by the thickness of the layer or layers present therebetween, an exposure-length metering structure which comprises: a film metering means including means coacting with said film-advancing means to cause interruption of film-advancing movement thereof at intervals corresponding to desired picture-lengths of said photo-sensitive surface as it is moved past said aperture, and control means for said metering means, said control means having a sensor portion normally engaging said pressure plate and movable in response to movement of said pressure plate toward and away from said aperture, and said control means also including a member operable by movement of said sensor portion and coacting with said film metering means to cause said metering means to act in movement-interrupting relation to said film-advancing means only when said pressure plate is spaced from said aperture a distance corresponding to the combined thicknesses of both said backing layer and said photosensitive layer.

ORTON H. WISEGARVER.

REFERENCES CITED

The following references are of record in the file of this patent:

UNITED STATES PATENTS

| Number | Name | Date |
|---|---|---|
| 2,016,611 | Muller | Oct. 8, 1935 |
| 2,102,574 | Reason et al. | Dec. 14, 1937 |
| 2,148,636 | Muller et al. | Feb. 28, 1939 |
| 2,301,956 | Kuppenbender et al. | Nov. 7, 1942 |

FOREIGN PATENTS

| Number | Country | Date |
|---|---|---|
| 616,006 | Germany | July 17, 1935 |